(12) United States Patent
Muranaka

(10) Patent No.: US 11,415,194 B2
(45) Date of Patent: Aug. 16, 2022

(54) DAMPER

(71) Applicant: NIFCO INC., Yokosuka (JP)

(72) Inventor: Makoto Muranaka, Yokosuka (JP)

(73) Assignee: NIFCO INC., Yokosuka (JP)

( * ) Notice: Subject to any disclaimer, the term of this patent is extended or adjusted under 35 U.S.C. 154(b) by 482 days.

(21) Appl. No.: 16/609,823

(22) PCT Filed: May 18, 2018

(86) PCT No.: PCT/JP2018/019286
§ 371 (c)(1),
(2) Date: Oct. 31, 2019

(87) PCT Pub. No.: WO2018/212323
PCT Pub. Date: Nov. 22, 2018

(65) Prior Publication Data
US 2020/0063826 A1 Feb. 27, 2020

(30) Foreign Application Priority Data
May 19, 2017 (JP) .............................. JP2017-099606

(51) Int. Cl.
*F16F 15/16* (2006.01)
*F16D 41/066* (2006.01)
*F16F 9/12* (2006.01)

(52) U.S. Cl.
CPC .......... *F16F 15/161* (2013.01); *F16D 41/066* (2013.01); *F16F 9/12* (2013.01);
(Continued)

(58) Field of Classification Search
CPC ........ F16F 15/161; F16F 9/12; F16F 2222/12; F16F 2232/02; F16D 41/066; F16D 2300/22; B60G 2202/22
(Continued)

(56) References Cited

U.S. PATENT DOCUMENTS 5,460,252 A * 10/1995 Kosugi ..................... E05F 3/14
                                                       188/291
9,103,390 B2 * 8/2015 Shimozaki .............. F16D 41/00
(Continued)

FOREIGN PATENT DOCUMENTS

JP        10184734 A     7/1998
JP        10213165 A     8/1998
(Continued)

OTHER PUBLICATIONS

International Search Report for the International Patent Application No. PCT/JP2018/019286, dated Jul. 17, 2018, 2 pages.

*Primary Examiner* — Thomas W Irvin
(74) *Attorney, Agent, or Firm* — KDB Firm PLLC

(57) ABSTRACT

This damper comprises: a housing accommodating a damping medium; and a rotor rotatable relative to the housing, inside the housing. A unidirectional clutch which stipulates rotation in one direction and a rotating shaft can be connected to each other coaxially. The unidirectional clutch, when supporting the rotating shaft, constitutes a first input object, whereas the rotating shaft constitutes a second input object when not being supported by the unidirectional clutch. A connection object comprises a first connection part capable of connecting to the first input object coaxially, and a second connection part capable of connecting to the second input object coaxially. Two separate connection states are provided, namely a state in which the first connection part and the first input object are connected to each other, and a state in which the second connection part and the second input object are connected to each other.

9 Claims, 7 Drawing Sheets

(52) U.S. Cl.
CPC ...... *F16D 2300/22* (2013.01); *F16F 2222/12* (2013.01); *F16F 2232/02* (2013.01)

(58) Field of Classification Search
USPC .......................................................... 188/290
See application file for complete search history.

(56) References Cited

U.S. PATENT DOCUMENTS

| | | | | |
|---|---|---|---|---|
| 2014/0083809 | A1* | 3/2014 | Shimozaki | F16F 9/12 192/46 |
| 2020/0256405 | A1* | 8/2020 | Yasui | F16F 9/12 |
| 2021/0215218 | A1* | 7/2021 | Takahashi | F16F 9/12 |

FOREIGN PATENT DOCUMENTS

| | | | |
|---|---|---|---|
| JP | 2005200902 | A | 7/2005 |
| JP | 3789181 | B2 | 6/2006 |
| JP | 2012241736 | A | 12/2012 |

* cited by examiner

Fig.6
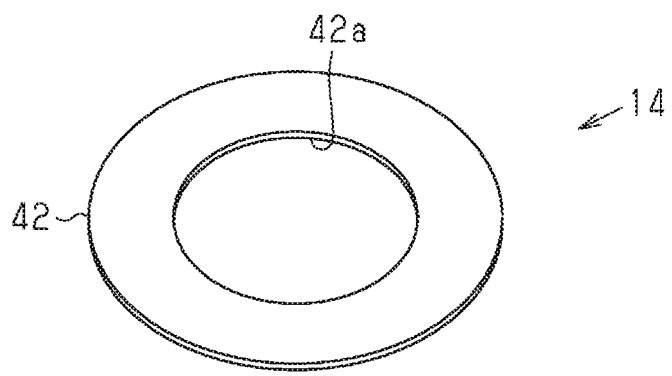
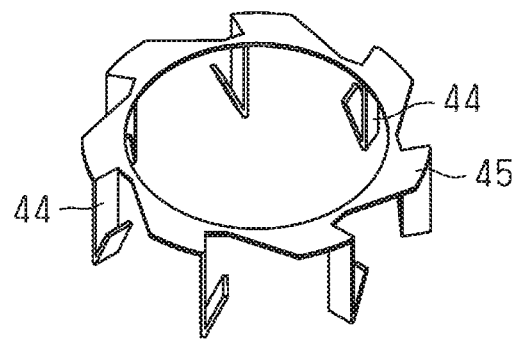
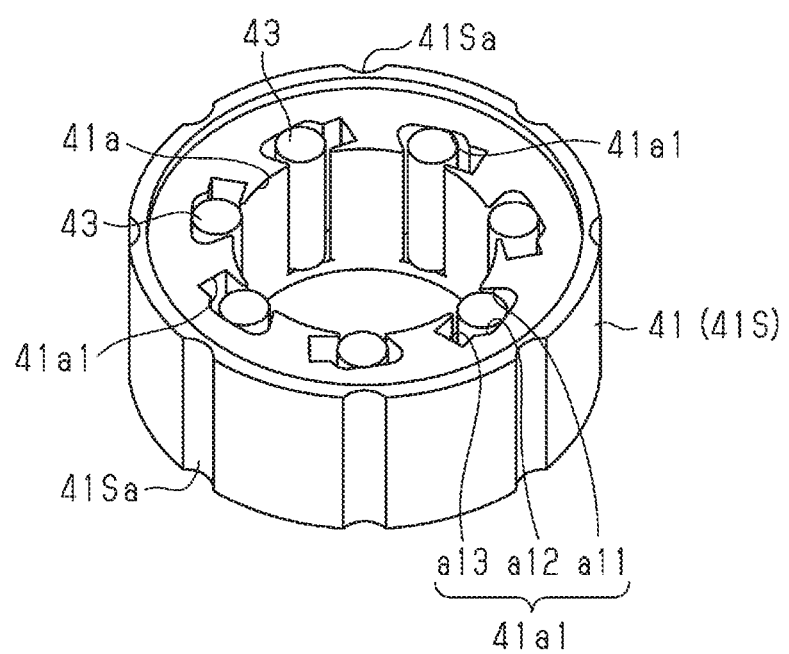

DAMPER

This is a national stage application filed under 35 U.S.C. § 371 of international application PCT/JP2018/019286 filed May 18, 2018, which claims priority to Japanese Patent application JP 2017-099606 filed May 19, 2017, the entirety of which applications are hereby incorporated by reference herein.

TECHNICAL FIELD

The present invention relates to a damper.

BACKGROUND ART

A known damper that dampens torque generated by rotation of a damping subject includes a one-way clutch. The damper includes the one-way clutch, a housing accommodating the one-way clutch, and a damping medium accommodated between the one-way clutch and the housing. The one-way clutch is accommodated in the housing in a state rotatable relative to the housing. The one-way clutch includes a cylindrical outer race having an inner circumferential surface. The inner circumferential surface of the outer race includes a cam surface in which a plurality of pockets are formed to hold cylindrical rollers and leaf springs that bias the cylindrical rollers against the cam surface. The inner circumferential surface also serves as a radial bearing of a rotation shaft, which is the damping subject.

In such a damper, when the rotation shaft is rotated in one direction, the cylindrical rollers are fitted to the cam surface so that the one-way clutch rotates with the rotation shaft. Accordingly, the damper dampens the torque of the rotation shaft. When the rotation shaft is rotated in a direction opposite to the one direction, the rotation shaft rotates relative to the one-way clutch. Accordingly, the damper does not dampen the torque of the rotation shaft (for example, refer to patent document 1).

PRIOR ART LITERATURE

Patent Literature

Patent Document 1: Japanese Patent No. 3789181

SUMMARY OF THE INVENTION

Problem to be Solved by the Invention

In the above damper, the inner circumferential surface in the outer race of the one-way clutch serves as the radial bearing that supports the rotation shaft. Thus, in order for the damper to serve as a damper that dampens the torque of the rotation shaft regardless of which one of the two directions the rotation shaft is rotated in, the entire one-way clutch, which rotates relative to the housing, needs to be replaced by a mechanism for implementing other functionalities. Therefore, there is a need for improving the versatility of members included in the damper.

One object of the present invention is to provide a damper that improves the versatility of members included in the damper.

Means for Solving the Problem

The damper that solves the above problems includes a housing and a rotor. The housing accommodates a damping medium. The rotor is rotatable relative to the housing in the housing. One of the housing and the rotor is a joining subject joined with an input subject. One of the housing and the rotor other than the joining subject is a non-joining subject. A one-way clutch that sets the rotation to a single direction and a rotation shaft are configured to be coaxially joined with each other. The one-way clutch in a state supporting the rotation shaft is a first input subject. The rotation shaft in a state not supported by the one-way clutch is a second input subject. The joining subject includes a first joining portion and a second joining portion. The first joining portion is configured to be coaxially joined with the first input subject. The second joining portion is configured to be coaxially joined with the second input subject and rotated integrally with the first joining portion. The joining subject is used in separate states where the first joining portion is joined with the first input subject and the second joining portion is joined with the second input subject.

BRIEF DESCRIPTION OF THE DRAWINGS

FIG. 6 is an exploded perspective view of a one-way clutch in accordance with the first embodiment.

EMBODIMENTS OF THE INVENTION

First Embodiment

A first embodiment of a damper will now be described with reference to FIGS. 1 to 8.

Figure 1:
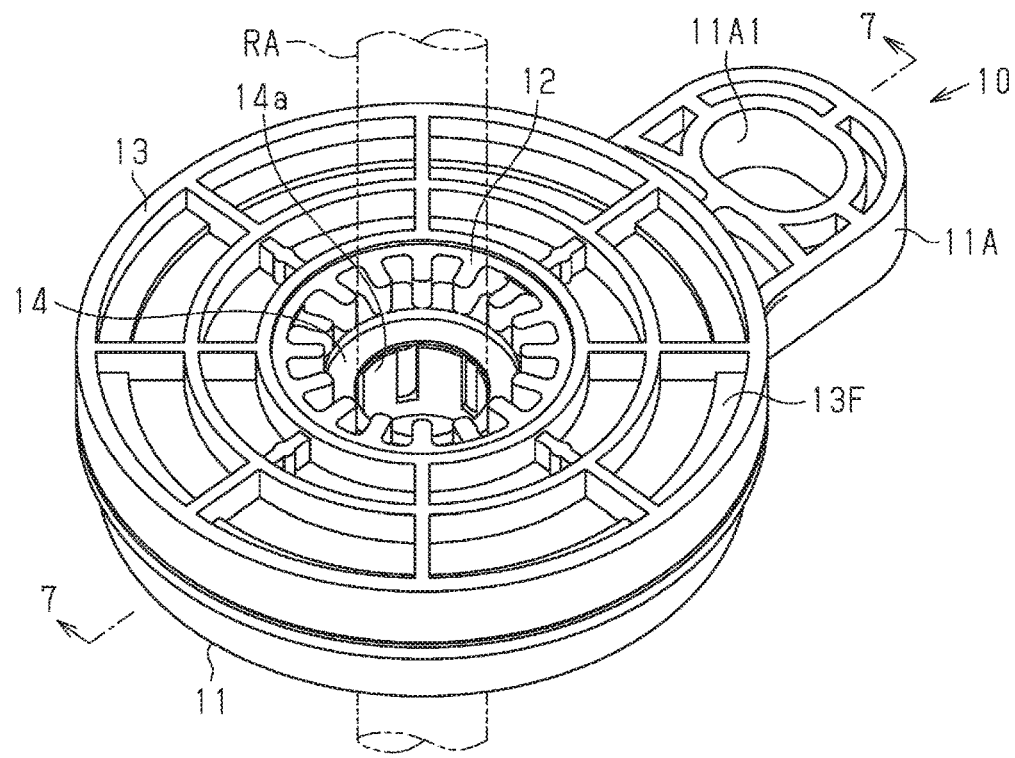
FIG. 1 is a perspective view showing the structure of a damper in accordance with a first embodiment and directed toward a front surface of a cap.

FIG. 1 is a perspective view showing the structure of the damper and directed toward a front surface of a cap of the damper.

As shown in FIG. 1, a damper 10 is a rotary damper and includes a housing 11, a rotor 12, and a cap 13. The housing 11 accommodates a damping medium. The rotor 12 is rotatable relative to the housing 11 in the housing 11. The rotor 12 is one example of a joining subject joined with an input subject, and the housing 11 is one example of a non-joining subject. In the damper 10 of the first embodiment, the position of the housing 11 relative to a coupling subject of the damper 10 is fixed, and the rotor 12 rotates relative to the housing 11. The cap 13 closes an opening of the housing 11.

A one-way clutch 14 is fitted into the rotor 12. The one-way clutch 14 is fitted into the rotor 12 in a state non-rotatable relative to the rotor 12 and rotatable with the rotor 12 relative to the housing 11. The one-way clutch 14 sets a single direction for the rotation of the rotor 12 relative to the housing 11. The one-way clutch 14 can be coaxially joined with a rotation shaft RA. The one-way clutch 14 in a state supporting the rotation shaft RA is one example of a first input subject. The rotation shaft RA in a state not supported by the one-way clutch 14 is one example of a second input subject. The one-way clutch 14 includes a shaft hole that extends through the one-way clutch 14. The shaft hole 14a receives the rotation shaft RA, which is a damping subject of the damper 10.

In a view directed toward a front surface 13F of the cap 13, the one-way clutch 14 is located at an inner side of the rotor 12 in the direction in which the rotation shaft RA extends. Further, in a view directed toward the front surface 13F of the cap 13, part of the one-way clutch 14 and part of the rotor 12 are exposed to the outside from the front surface 13F of the cap 13.

The housing 11 includes a coupling portion 11A that extends radially outward from a circular circumferential wall as viewed in a plan view of the front surface 13F of the cap 13. The coupling portion 11A includes a coupling hole 11A1 that extends through the coupling portion 11A in the direction in which the rotation shaft RA extends. The coupling hole 11A1 receives a coupling member to couple the housing 11 to the coupling subject of the damper 10. The coupling member, which is extended through the coupling hole 11A1, is coupled to the coupling subject to fix the damper 10 to the coupling subject.

Figure 2:
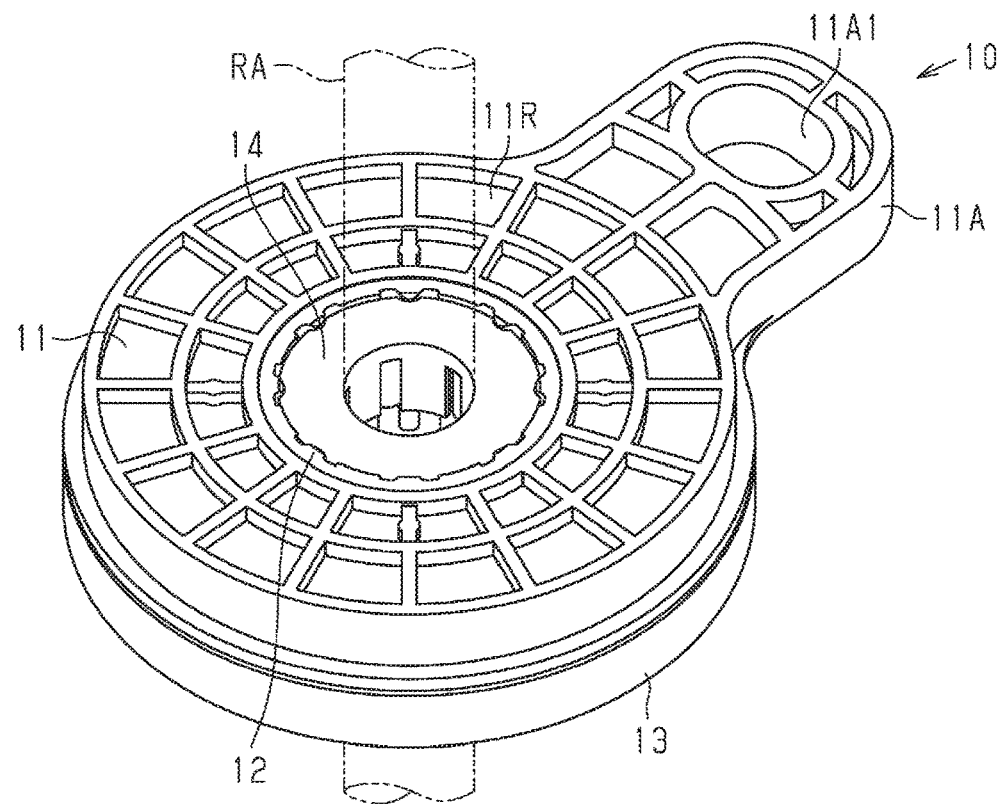
FIG. 2 is a perspective view showing the structure of the damper in accordance with the first embodiment and directed toward a rear surface of a housing.

FIG. 2 is a perspective view showing the damper 10 and directed toward a rear surface 11R of the housing 11.

In the view of FIG. 2 directed toward the rear surface 11R of the housing 11, the one-way clutch 14 is exposed to the outside from the rear surface 11R of the housing 11. Further, in the view directed toward the rear surface 11R of the housing 11, part of the rotor 12 is exposed to the outside from the rear surface 11R of the housing 11.

Preferably, the housing 11, the rotor 12, and the cap 13 are formed from the same material. The main component of the material may be a resin, a metal, or an alloy. The housing 11, the rotor 12, and the cap 13 may be formed from different materials.

Figure 3:
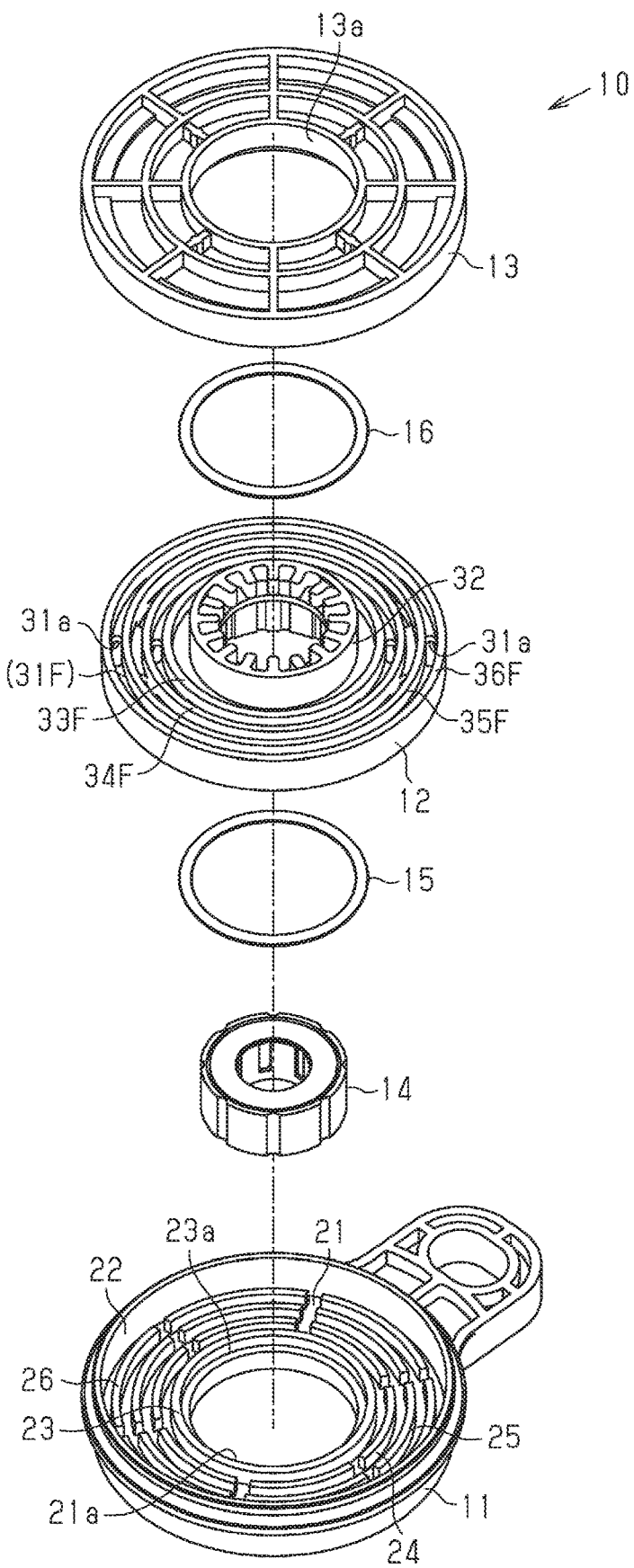
FIG. 3 is an exploded perspective view showing the damper in accordance with the first embodiment dismantled into a number of members.

As shown in FIG. 3, the housing 11 is cylindrical and includes a bottom portion 21 and a circumferential wall portion 22. The bottom portion 21 includes a through hole 21a and a central wall portion 23. The through hole 21a extends through the bottom portion 21 in the direction in which the rotation shaft RA extends. The central wall portion 23 is cylindrical and surrounds the through hole 21a. The central wall portion 23 includes an inner circumferential surface on which a step 23a is formed extending inward in the radial direction of the bottom portion 21. The step 23a is an annular dent extending along the entire central wall portion 23 in a circumferential direction. The step 23a receives an annular housing-side seal member 15. The housing-side seal member 15 is formed by an elastic member of an elastomer or the like.

The housing 11 has an inner surface including projected surfaces that extend in a circumferential direction of the rotation shaft RA and project toward the space for accommodating the damping medium. The housing 11 includes a plurality of inner wall portions 24, a plurality of intermediate wall portions 25, and a plurality of outer wall portions 26. The wall portions are located on the bottom portion 21 of the housing 11 between the circumferential wall portion 22 and the central wall portion 23. The inner wall portions 24, the intermediate wall portions 25, and the outer wall portions 26 each include an outer surface, which is one example of a first projected surface projected toward the space for accommodating the damping medium in the housing 11 in the direction in which the rotation shaft RA extends.

The inner wall portions 24 are each arcuate as shown in the view directed toward the opening of the housing 11. A gap is formed between each inner wall portion 24 and the adjacent inner wall portion 24. As shown in the view directed toward the opening of the housing 11, the inner wall portions 24 are arranged next to one another at equal intervals in a circumferential direction of the central wall portion 23 so as to form a circle about the center of the bottom portion 21.

The intermediate wall portions 25 are located closer to the circumferential wall portion 22 than the inner wall portions 24. As shown in the view directed toward the opening of the housing 11, the intermediate wall portions 25 are each arcuate. Each intermediate wall portion 25 is longer than each inner wall portion 24 in the circumferential direction of the central wall portion 23. A gap is formed between each intermediate wall portion 25 and the adjacent intermediate wall portion 25. As shown in the view directed toward the opening of the housing 11, the intermediate wall portions 25 are arranged next to one another at equal intervals in the circumferential direction of the central wall portion 23 so as to form a circle about the center of the bottom portion 21.

The outer wall portions 26 are located closer to the circumferential wall portions 22 than the intermediate wall portions 25. As shown in the view directed toward the opening of the housing 11, the outer wall portions 26 are each arcuate. Each outer wall portion 26 is longer than the central wall portion 23 in the circumferential direction of the intermediate wall portion 25. A gap is formed between each outer wall portion 26 and the adjacent outer wall portion 26. As shown in the view directed toward the opening of the housing 11, the outer wall portions 26 are arranged next to one another at equal intervals in the circumferential direction of the central wall portion 23 so as to form a circle about the center of the bottom portion 21.

With the damper 10 including such housing 11, when the rotor 12 rotates relative to the housing 11, friction is produced between the damping medium and the projected surfaces, namely, the outer surfaces of the inner wall portions 24, the intermediate wall portions 25, and the outer wall portions 26. The friction increases the damping force of the damper 10.

The housing 11 accommodates the disc-like rotor 12 in a state rotatable in the clockwise direction and the counterclockwise direction about the rotation shaft RA. The counterclockwise direction is one example of one direction, and the clockwise direction is one example of a direction opposite to the one direction. The rotor 12 includes a disc-like support portion 31 and a tubular portion 32. The tubular portion 32 is located at the central part of the support portion 31 and is a rotation center of the rotor 12. The tubular portion 32 is cylindrical and projects from a front surface 31F of the support portion 31 and a rear surface of the support portion 31.

Four annular front wall portions are concentrically arranged next to one another on the front surface 31F of the support portion 31 outside the tubular portion 32. A first front wall portion 33F, a second front wall portion 34F, a third front wall portion 35F, and a fourth front wall portion 36F are arranged in the described order toward the outer side in the radial direction of the tubular portion 32. Four annular rear wall portions are also concentrically arranged next to one another toward the outer side in the radial direction of the tubular portion 32 on the rear surface of the support portion 31. A first rear wall portion, a second rear wall portion, a third rear wall portion, and a fourth rear wall portion are arranged in the described order toward the outer side in the radial direction of the tubular portion 32. The outer surface of each rear wall portion is one example of a second projected surface.

The four front wall portions and the four rear wall portions are positioned to be plane-symmetrical with respect to the front surface 31F of the support portion 31. As viewed in a direction in which the tubular portion 32 extends, the first front wall portion 33F entirely overlaps the first rear wall portion, the second front wall portion 34F entirely overlaps the second rear wall portion, the third front wall portion 35F entirely overlaps the third rear wall portion, and the fourth front wall portion 36F entirely overlaps the fourth rear wall portion.

Among the four front wall portions, a gap is formed between the first front wall portion 33F and the second front wall portion 34F, a gap is formed between the second front wall portion 34F and the third front wall portion 35F, and a gap is formed between the third front wall portion 35F and the fourth front wall portion 36F. Further, among the four rear wall portions, a gap is formed between the first rear wall portion and the second rear wall portion, a gap is formed between the second rear wall portion and the third rear wall portion, and a gap is formed between the third rear wall portion and the fourth rear wall portion.

As viewed in the direction in which the tubular portion 32 extends, the support portion 31 includes a plurality of through holes 31a that extend through the support portion 31 in locations between the first front wall portion 33F and the second front wall portion 34F. Further, as viewed in the direction in which the tubular portion 32 extends, the support portion 31 includes a plurality of through holes 31a that extend through the support portion 31 in locations between the second front wall portion 34F and the third front wall portion 35F. Furthermore, as viewed in the direction in which the tubular portion 32 extends, the support portion 31 includes a plurality of through holes 31a that extend through the support portion 31 in locations between the third front wall portion 35F and the fourth front wall portion 36F.

The cap 13 is disc-like and includes a through hole 13a extending through the cap 13 at the central part of the cap 13. A cap-side seal member 16 is located between the cap 13 and the rotor 12. The annular cap-side seal member 16 is formed from an elastic material such as elastomer in the same manner as the above described housing-side seal member 15.

In a state in which the damper 10 is assembled, the through hole 21a of the housing 11 receives part of the tubular portion 32 of the rotor 12 that projects from the rear surface of the support portion 31, and the through hole 13a of the cap 13 receives part of the tubular portion 32 of the rotor 12 that projects from the front surface 31F of the support portion 31. The tubular portion 32 extends through the through hole 21a of the housing 11 and the through hole 13a of the cap 13 in a state rotatable relative to the housing 11 and the cap 13. Further, the housing-side seal member 15 is held between the housing 11 and the rotor 12, and the cap-side seal member 16 is held between the rotor 12 and the cap 13. The one-way clutch 14 is fitted to the tubular portion 32 of the rotor 12 in a state non-rotatable relative to the rotor 12.

Figure 4:
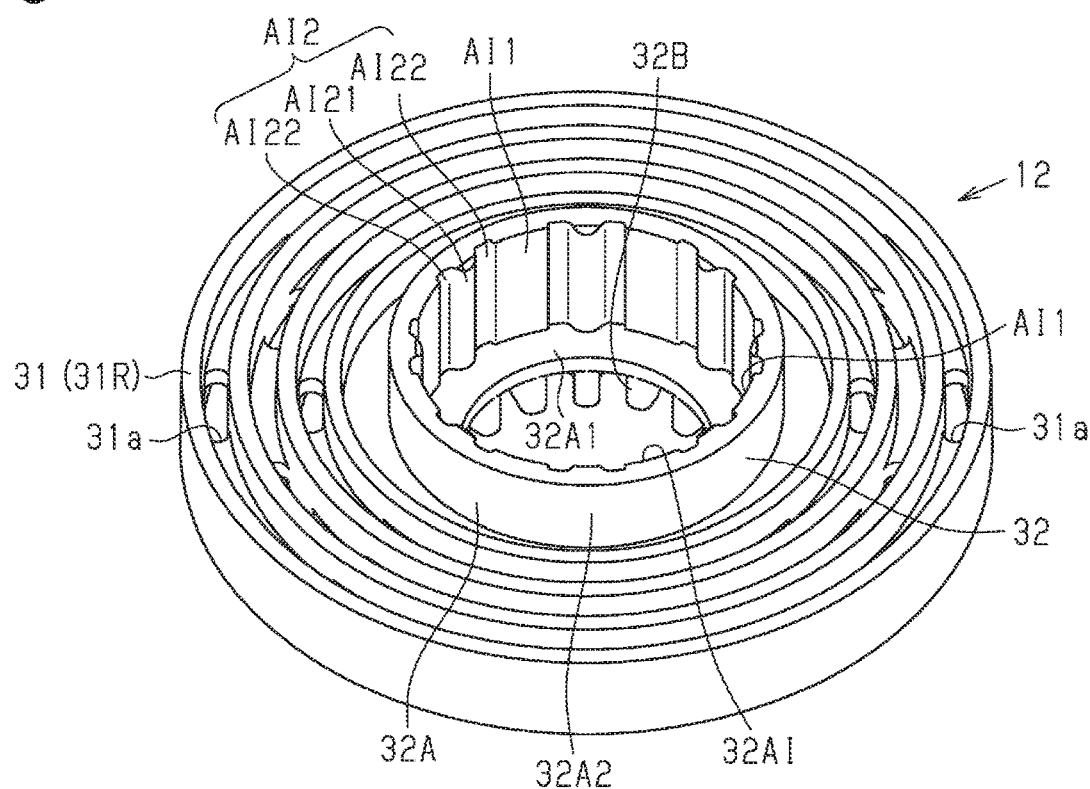
FIG. 4 is a perspective view showing the structure of a rotor in accordance with the first embodiment and directed toward a rear surface of a support portion.
Figure 5:
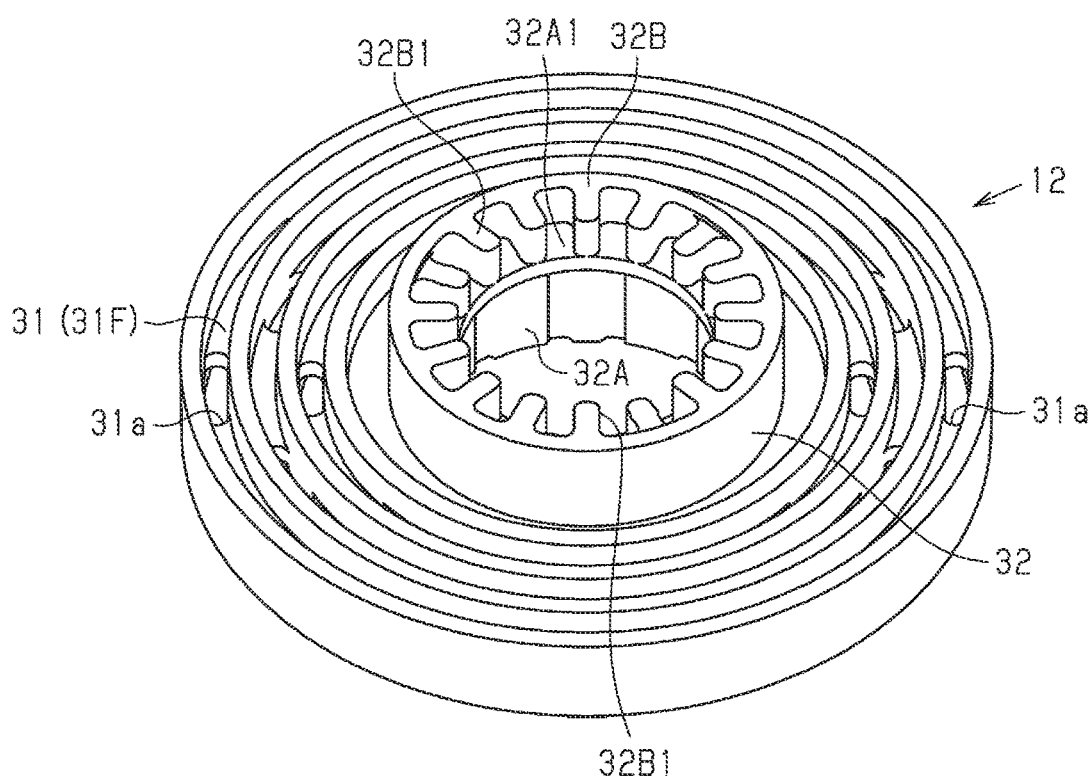
FIG. 5 is a perspective view showing the structure of the rotor in accordance with the first embodiment and directed toward a front surface of the support portion.

The structure of the rotor 12 will now be described in more detail with reference to FIGS. 4 and 5. FIG. 4 shows a perspective structure of the rotor 12 directed toward the rear surface of the support portion 31. FIG. 5 is a perspective view showing the structure of the rotor 12 and directed toward the front surface 31F of the support portion 31.

As shown in FIG. 4, the rotor 12 includes a first fitting portion 32A and a second fitting portion 32B. The first fitting portion 32A is one example of a first joining portion and the second fitting portion 32B is one example of a second joining portion. The first fitting portion 32A is configured to be coaxially joined with the one-way clutch 14 in a state in which the first fitting portion 32A is supporting the rotation shaft RA. The second fitting portion 32B is rotated integrally with the first fitting portion 32A and configured to be coaxially joined with the rotation shaft RA in a state not supported by the one-way clutch 14. The damper including the rotor 12 is used in separate states where the first fitting portion 32A is joined with the one-way clutch 14, which supports the rotation shaft RA, and the second fitting portion 32B is joined with the rotation shaft RA, which is not supported by the one-way clutch 14.

When the one-way clutch 14 is fitted to the first fitting portion 32A, the rotor 12 serves as a member forming a one-way damper. Further, when the rotation shaft RA is fitted to the second fitting portion 32B, the rotor 12 serves as a member forming a two-way damper. In this manner, a single rotor 12 can be used as a member forming a damper having different functionalities. This improves the versatility of the member included in the damper.

As described above, the rotor 12 includes the tubular portion 32 positioned coaxially with the rotation shaft RA. One end of the tubular portion 32 is the first fitting portion 32A, and the other end of the tubular portion 32 is the second fitting portion 32B. Thus, the same tubular portion 32 has the functionalities of both the first fitting portion 32A and the second fitting portion 32B. This reduces the number of members forming the damper 10.

The first fitting portion 32A includes an inner circumferential surface 32AI, which is one example of a fitting surface to which the one-way clutch 14 is fitted. The inner circumferential surface 32AI is the fitting surface including repetitive corrugations in the circumferential direction of the rotation shaft RA. When the one-way clutch 14 is fitted to the inner circumferential surface 32AI, the first fitting portion 32A is coaxially joined with the one-way clutch 14. The first fitting portion 32A includes the part of the tubular portion 32 projecting from a rear surface 31R of the support portion 31 and a part of the tubular portion 32 projecting from the front surface 31F of the support portion 31. The first fitting portion 32A includes a tubular portion formed by a bottom portion 32A1 and a circumferential wall portion 32A2. The circumferential wall portion 32A2 includes the inner circumferential surface 32AI.

The inner circumferential surface 32AI includes a plurality of arcuate portions AI1. In a plan view of the rear surface 31R of the support portion 31, the arcuate portions AI1 are each arcuate and arranged at equal intervals in a circumferential direction of the tubular portion 32 so as to form a circle about the center of the tubular portion 32. In the circumferential direction of the tubular portion 32, a corrugated portion AI2 is included between adjacent arcuate portions AI1. The corrugated portion AI2 includes a projection AI21 and two recesses AI22. In plan view of the rear surface 31R of the support portion 31, the projection AI21 is projected radially inward from the arcuate portion AI1 and the recesses AI22 are recessed radially outward from the arcuate portion AI1. In each corrugated portion AI2, the two recesses AI22 sandwich the projection AI21 in the circumferential direction.

When the one-way clutch 14 is fitted into the first fitting portion 32A, an outer circumferential surface of the one-way clutch 14 contacts the inner circumferential surface 32AI of the circumferential wall portion 32A2. Further, one end surface of the one-way clutch 14 contacts the bottom portion 32A1 in a direction in which the one-way clutch 14 extends. The inner circumferential surface 32AI, which is fitted to the one-way clutch 14, includes the corrugations repetitively arranged in the circumferential direction of the rotation shaft RA to restrict movement of the one-way clutch 14 relative to the rotor 12 in the circumferential direction of the rotation shaft RA.

As shown in FIG. 5, the second fitting portion 32B includes a plurality of projections 32B1 that are arranged in the circumferential direction of the rotation shaft RA. The projections 32B1 are configured to contact and support the rotation shaft RA. In a state in which the second fitting portion 32B is coaxially joined with the rotation shaft RA, the projections 32B1 each support the rotation shaft RA. Each of the projections 32B1 is projected radially inward from the tubular portion 32. The projections 32B1 are arranged along the entire tubular portion 32 in the circumferential direction. The projections 32B1 each extend from the bottom portion 32A1 of the first fitting portion 32A in the direction in which the tubular portion 32 extends away from the front surface 31F of the support portion 31. The projections 32B1 each have a distal end, and the distal ends of the projections 32B1 are arranged at equal intervals in the circumferential direction of the tubular portion 32 so as to form a circle about the center of the tubular portion 32. With the second fitting portion 32B, the projections 32B1 of the second fitting portion 32B each support the rotation shaft RA so as to restrict displacement of the rotation shaft RA relative to the second fitting portion 32B when the rotation shaft RA is rotated.

The second fitting portion 32B can be used to conduct tests or the like on both the damper 10 including the one-way clutch 14 and a damper without the one-way clutch 14. For example, the second fitting portion 32B exposed to the outside from the housing 11 is fitted to an apparatus including a fitting portion fitted to the projections 32B1 of the second fitting portion 32B. The apparatus is one example of an apparatus for testing an engagement subject and is coupled to the damper from the side of the cap 13 with respect to the housing 11. Then, the apparatus is rotated in the clockwise direction and the counterclockwise direction to rotate the rotor 12 relative to the housing 11 and the cap 13 and test the damper. The rotor 12 is used in separate states where the first fitting portion 32A is fitted to the first input subject, the second fitting portion 32B is fitted to the second input subject, and the second fitting portion 32B is fitted to the testing apparatus.

The structure of the one-way clutch 14 in accordance with one example will now be described in more detail with reference to FIG. 6.

As shown in FIG. 6, the one-way clutch 14 includes an accommodation member 41 and a cover 42 that covers an opening of the accommodation member 41. The accommodation member 41 is cylindrical and extends in the direction in which the rotation shaft RA extends. The accommodation member 41 has an inner circumferential surface 41a including a plurality of holding grooves 41a1. Each of the holding grooves 41a1 extends in the direction in which the rotation shaft RA extends. The holding grooves 41a1 are arranged at equal intervals in a circumferential direction of the accommodation member 41. The cover 42 is disc-like and includes a through hole 42a at the central part of the cover 42 extending through the cover 42 in a direction in which the accommodation member 41 extends.

The one-way clutch 14 further includes a plurality of cylindrical rollers 43 and a plurality of leaf springs 44. Each of the leaf springs 44 is one example of a biasing member. The cylindrical rollers 43 are each rod-shaped, extended in the direction in which the rotation shaft RA extends, and held in each of the holding grooves 41a1. The leaf springs 44 are each held in each of the holding grooves 41a1 in the same manner as the cylindrical rollers 43. The leaf springs 44 are connected to an annular portion 45 and arranged at equal intervals in a circumferential direction of the annular portion 45.

The holding grooves 41a1 each include a fixing portion a11, a non-fixing portion a12, and a holding portion a13. The fixing portion a11 holds the cylindrical roller 43 in a fixed state. The non-fixing portion a12 holds the cylindrical roller 43 in a rotatable state. The holding portion a13 holds the leaf spring 44. The fixing portion a11, the non-fixing portion a12, and the holding portion a13 are arranged in the described order in the circumferential direction of the rotation shaft RA in each of the holding groove 41a1. Each leaf spring 44 biases the cylindrical roller 43 from the holding portion a13 toward the fixing portion a11. Each of the cylindrical rollers 43 is held in the corresponding holding groove 41a1 by the holding groove 41a1 and the leaf spring 44 so as to be located in the fixing portion a11 when the rotation shaft RA rotates in the counterclockwise direction and located in the non-fixing portion a12 when the rotation shaft RA rotates in the clockwise direction.

In a view directed toward the opening of the accommodation member 41, the non-fixing portion a12 is a cam surface defining a space so that the cylindrical roller 43 is in contact with the holding groove 41a1 but not fixed to the holding groove 41a1. The fixing portion a11 is a cam surface that defines a space that becomes smaller from the holding portion a13 toward the fixing portion a11.

The accommodation member 41 has an outer circumferential surface 41S including a plurality of depressions 41Sa depressed inward in the radial direction of the accommodation member 41. The depressions 41Sa are arranged at equal intervals in the circumferential direction of the accommodation member 41. When the one-way clutch 14 is fitted into the first fitting portion 32A, the depressions 41Sa of the outer circumferential surface 41S are each fitted to a corresponding projection AI21 located on the inner circumferential surface 32AI of the first fitting portion 32A.

With the one-way clutch 14, when the rotation shaft RA rotates counterclockwise, the cylindrical rollers 43 are fixed to the accommodation member 41 so that the accommodation member 41 rotates with the rotation shaft RA. Thus, the damper 10 dampens the torque of the rotation shaft RA.

When the rotation shaft RA rotates clockwise, the cylindrical rollers 43 are not fixed to the accommodation member 41 so that the rotation shaft RA rotates relative to the accommodation member 41. Thus, the damper 10 does not dampen the torque of the rotation shaft RA. The one-way clutch 14 may be configured so that the accommodation member 41 rotates with the rotation shaft RA when the rotation shaft RA rotates in the clockwise direction and so that the rotation shaft RA rotates relative to the accommodation member 41 when the rotation shaft RA rotates in the counterclockwise direction.

Figure 7:
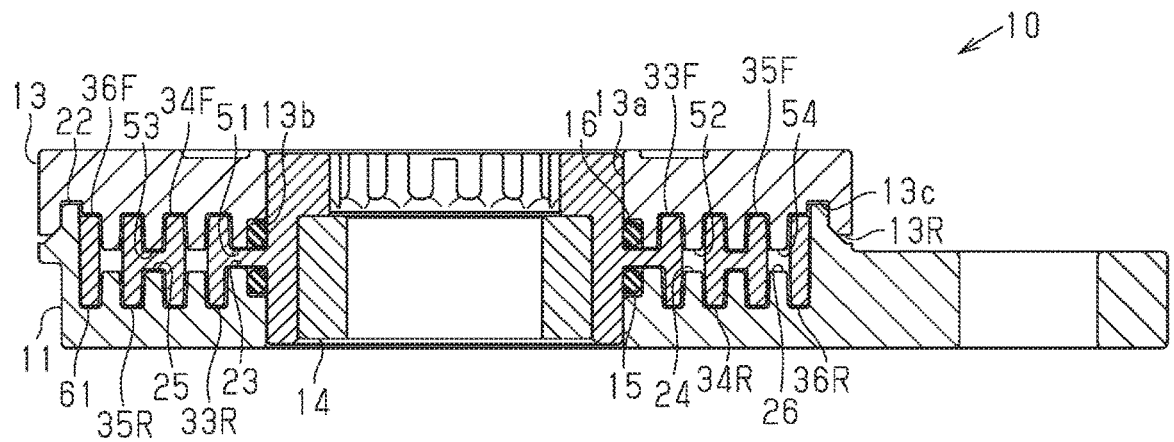
FIG. 7 is a cross-sectional view showing the structure of the damper in accordance with the first embodiment taken along line 7-7 in FIG. 1.

FIG. 7 is a cross-sectional view showing the structure of the damper 10 taken along line 7-7 in FIG. 1. In FIG. 7, the one-way clutch 14 is shown as a single member to facilitate understanding. Further, the accommodation member 41, the cover 42, the cylindrical roller 43, the leaf spring 44, and the annular portion 45 of the one-way clutch 14 are not shown in the drawing.

As shown in FIG. 7, the cap 13 includes a rear surface 13R on which a central wall portion 51 is located. The central wall portion 51 surrounds the through hole 13a and is projected toward the housing 11. On the rear surface 13R of the cap 13, a plurality of cap-side wall portions are located radially outward from the central wall portion 51. The cap-side wall portions are each projected toward the housing 11. The cap-side wall portions are each arcuate and extend about the center of the cap 13. On the rear surface of the cap 13, a plurality of first cap-side wall portions 52, a plurality of second cap-side wall portions 53, and a plurality of third cap-side wall portions 54 are arranged next to one another in the described order outward from the center of the cap 13.

In a view directed toward the rear surface 13R of the cap 13, a gap is formed between each first cap-side wall portion 52 and the adjacent first cap-side wall portion 52. In a view directed toward the rear surface 13R of the cap 13, the first cap-side wall portions 52 are arranged next to one another at equal intervals in a circumferential direction of the central wall portion 51 so as to form a circle about the center of the cap 13.

In a view directed toward the rear surface 13R of the cap 13, a gap is formed between each second cap-side wall portion 53 and the adjacent second cap-side wall portion 53. In a view directed toward the rear surface 13R of the cap 13, the second cap-side wall portions 53 are arranged next to one another at equal intervals in the circumferential direction of the central wall portion 51 so as to form a circle about the center of the cap 13.

In a view directed toward the rear surface 13R of the cap 13, a gap is formed between each third cap-side wall portion 54 and the adjacent third cap-side wall portion 54. In a view directed toward the rear surface 13R of the cap 13, the third cap-side wall portions 54 are arranged next to one another at equal intervals in the circumferential direction of the central wall portion 51 so as to form a circle about the center of the cap 13.

The first cap-side wall portions 52 are fitted in a gap between the first front wall portion 33F and the second front wall portion 34F. The second cap-side wall portions 53 are fitted in a gap between the second front wall portion 34F and the third front wall portion 35F. The third cap-side wall portions 54 are fitted in a gap between the third front wall portion 35F and the fourth front wall portion 36F.

The central wall portion 51 includes a step 13b recessed radially outward. The step 13b receives the cap-side seal member 16. Further, the rear surface 13R of the cap 13 includes a step 13c formed radially outward from the third cap-side wall portions 54 and recessed in a direction extending away from the housing 11. The step 13c receives the circumferential wall portion 22 of the housing 11.

The first rear wall portion 33R of the rotor 12 is fitted in the gap between the central wall portions 23 and the inner wall portions 24 of the housing 11. The second rear wall portion 34R is fitted in the gap between the inner wall portions 24 and the intermediate wall portions 25. The third rear wall portion 35R is fitted in the gap between the intermediate wall portions 25 and the outer wall portions 26. The fourth rear wall portion 36R is fitted in the gap between the outer wall portions 26 and the circumferential wall portion 22. The four rear wall portions and the housing 11 are in a clearance fit and a slight clearance extends between the housing 11 and each rear wall portion. The slight clearances are filled with a gel-like damping medium 61.

In this manner, the outer surface of the rotor 12 includes the outer surfaces of the four rear wall portions as one example of the second projected surfaces extending in the circumferential direction of the rotation shaft RA. As viewed in the direction in which the rotation shaft RA extends, the outer surfaces of the rear wall portions are configured so as not to overlap the outer surfaces of the inner wall portions 24, the intermediate wall portions 25, and the outer wall portions 26, which are one example of the first projected surface. The first projected surfaces and the second projected surfaces define part of the space for accommodating the damping medium 61. With the rotor 12, the damping medium 61 accommodated between the first projected surface and the second projected surface is sheared when the rotor 12 rotates relative to the housing 11. This improves the damping force of the damper 10.

Further, the rotor 12 includes four front wall portions. As viewed in the direction in which the rotation shaft RA extends, the front wall portions are configured not to overlap the central wall portion 51, the first cap-side wall portions 52, the second cap-side wall portions 53, and the third cap-side wall portions 54. With the rotor 12, the damping medium 61 accommodated between the outer surfaces of the front wall portions and the outer surfaces of the wall portions of the cap 13 is sheared when the rotor 12 rotates relative to the cap 13. This improves the damping force of the damper 10.

The first front wall portion 33F is fitted in the gap between the central wall portion 51 and the first cap-side wall portions 52. The second front wall portion 34F is fitted in the gap between the first cap-side wall portions 52 and the second cap-side wall portions 53. The third front wall portion 35F is fitted in the gap between the third cap-side wall portions 54 and the circumferential wall portion 22 of the housing 11. The front wall portions, the cap 13, and the housing 11 are in a clearance fit with slight clearances extending in between. The slight clearances are filled with the damping medium 61.

In the space defined by the housing 11 and the cap 13, the region located radially outward from the tubular portion 32 of the rotor 12 is a rotation region allowing for the rotation of the rotor 12. In contrast, the region formed by the gap between the housing 11 and the rotor 12 and the gap between the cap 13 and the rotor 12 is a torque generation region that generates a braking torque. The rotation of the rotor 12 shears the damping medium 61 filled in the torque generation region and dampens the force rotating the rotor 12.

For example, when the rotor 12 is driven and rotated by the rotation of the rotation shaft RA, the braking torque, which is the damping force, is applied to the rotation shaft RA by the resistance of the damping medium 61 filling the torque generation region. Here, the damping medium 61 sticks to the outer surface of the rotor 12 in the radial direction of the rotor 12. Further, the damping medium 61 moves between the front surface 31F of the support portion 31 and the rear surface 31R through the through holes 31*a* formed in the rotor 12 so that the damping medium 61 also sticks to the outer surface of the rotor 12 in a direction extending from the front surface 31F of the support portion 31 toward the rear surface 31R. The rotor 12 is rotated while shearing the damping medium 61 stuck to the outer surface of the rotor 12. The rotation of the rotor 12 also applies braking torque to the rotation shaft RA.

In the rotor 12, the region where the damping medium 61 is sheared is the region sandwiched by a portion extending from the fourth front wall portion 36F and the fourth rear wall portion 36R to the first front wall portion 33F and the first rear wall portion 33R, part of the housing 11 facing this portion, and part of the cap 13 facing the same portion.

Figure 8:
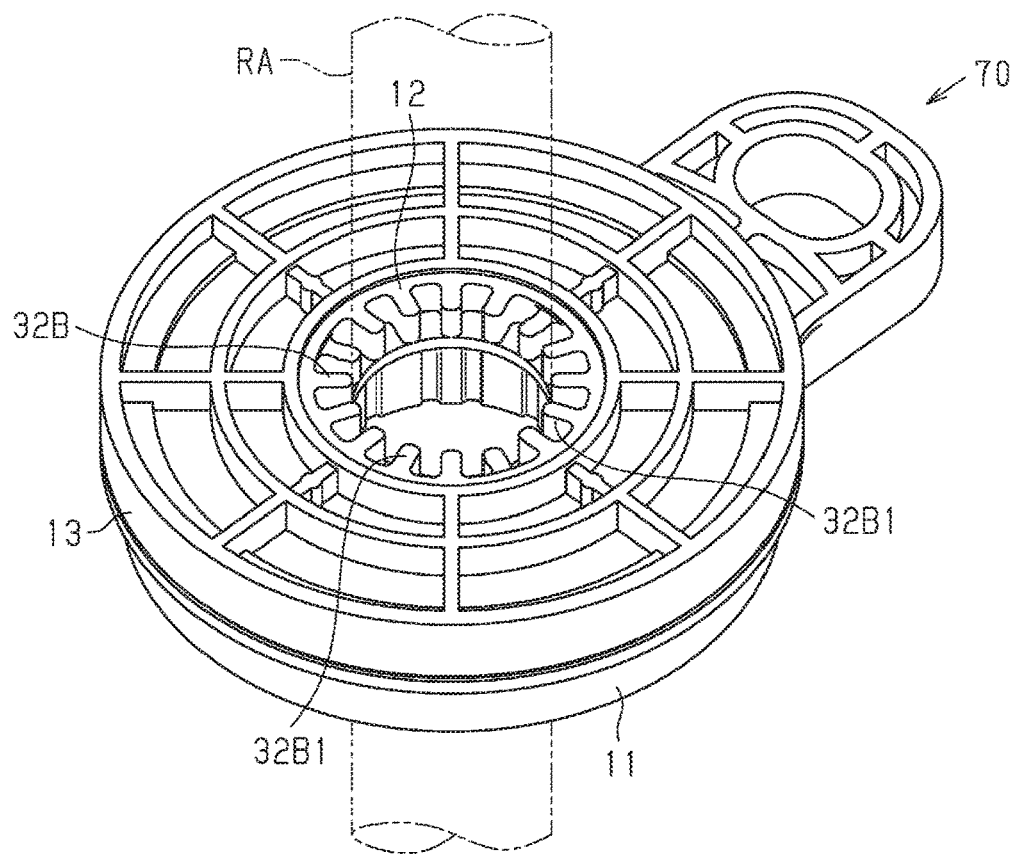
FIG. 8 is a perspective view showing the structure of the damper in accordance with the first embodiment in which a rotation shaft is fitted to a second fitting portion.

As shown in FIG. 8, in a damper 70 in which the one-way clutch 14 is not fitted to the first fitting portion 32A of the rotor 12, the rotation shaft RA is supported by a plurality of the projections 32B1 of the second fitting portion 32B. This rotates the rotation shaft RA with the rotor 12 in both of the clockwise direction and the counterclockwise direction. Thus, the damper 70 dampens the torque of the rotation shaft RA when rotated in both of the clockwise direction and the counterclockwise direction.

As described above, the damper of the first embodiment obtains the following advantages.

(1) The rotor 12 includes the one-way clutch 14 fitted into the first fitting portion 32A to function as a member forming a one-way damper. Further, when the rotation shaft RA is fitted into the second fitting portion 32B, the rotor 12 functions as a member forming a two-way damper. In this way, the same rotor 12 can be used as a member forming a damper having different functionalities. This improves the versatility of the member included in the damper.

(2) Even when the rotor 12 is engaged with an engagement subject, the rotor 12 rotates relative to the housing 11.

(3) The inner circumferential surface 32AI, which is fitted to the one-way clutch 14, includes the corrugations repetitively arranged in the circumferential direction of the rotation shaft RA to restrict movement of the one-way clutch 14 relative to the rotor 12 in the circumferential direction of the rotation shaft RA.

(4) The same tubular portion 32 includes the functionalities of both of the first fitting portion 32A and the second fitting portion 32B. This allows for reduction in the number of members forming the damper 10.

(5) When the rotor 12 rotates relative to the housing 11, friction is produced between the outer surfaces of the inner wall portions 24, the intermediate wall portions 25, and the outer wall portions 26 and the damping medium 61. The friction increases the damping force of the damper 10.

(6) Rotation of the rotor 12 relative to the housing 11 shears the damping medium 61 accommodated between the outer surfaces of the rear wall portions and the outer surfaces of the inner wall portions 24, the intermediate wall portions 25, and the outer wall portions 26 of the housing 11. This increases the damping force of the damper 10.

(7) The projections 32B1 of the second fitting portion 32B support the rotation shaft RA so that the rotation shaft RA. This restricts displacement of the rotation shaft RA relative to the second fitting portion 32B when the rotation shaft RA rotates.

(8) With the one-way clutch 14, when the rotation shaft RA rotates in the counterclockwise direction, the cylindrical rollers 43 are fixed to the accommodation member 41 so that the accommodation member 41 rotates with the rotation shaft RA. Thus, the damper 10 dampens the torque of the rotation shaft RA. When the rotation shaft RA rotates clockwise, the cylindrical rollers 43 are not rotated by the accommodation member 41 so that the rotation shaft RA rotates relative to the accommodation member 41. Thus, the damper 10 does not dampen the torque of the rotation shaft RA.

The above described first embodiment may be modified as follows.

The one-way clutch 14 may have a structure other than the structure in which the cylindrical rollers 43 and the leaf springs 44 are held in the holding grooves 41*a*1 as described above. Specifically, the one-way clutch may be a one-way clutch fitted to the first fitting portion 32A of the rotor 12 to set the rotation of the rotor 12 relative to the housing 11 to a single direction.

The second fitting portion 32B does not have to include the projections 32B1. The second fitting portion 32B may be cylindrical and include a flat inner circumferential surface. The second fitting portion 32B need only be configured so that it can be joined with the rotation shaft RA in a state in which the one-way clutch 14 is not joined with the first fitting portion 32A. This will obtain an advantage corresponding to advantage (1).

The rotor 12 may have the form of a flat plate in which the outer surface of the rotor 12 does not include a plurality of rotor-side projected surfaces.

The housing 11 may be shaped to include a flat surface in which the inner surface of the housing 11 does not include a housing-side projected surface. When the inner surface of the housing 11 is flat the outer surface of the rotor 12 may include a plurality of rotor-side projected surfaces but does not have to include a plurality of rotor-side projected surfaces.

The inner circumferential surface 32AI of the first fitting portion 32A may be a flat surface that does not include corrugations arranged in the circumferential direction of the rotation shaft RA. Further, the inner circumferential surface 32AI of the first fitting portion 32A may include corrugations arranged in the direction in which the rotation shaft RA extends. Such a structure restricts separation of the one-way clutch 14, which is fitted to the first fitting portion 32A, from the first fitting portion 32A.

The second fitting portion 32B of the rotor 12 can be joined with the rotation shaft RA, which is not joined with the one-way clutch 14, and also fitted to a testing apparatus or the like. Instead, the second joining portion of the rotor 12 can be configured so that is it joined with the rotation shaft RA, which is not joined with the one-way clutch 14, but not fitted to a testing apparatus or the like. In such a configuration, the rotor 12 may include a member, which is an engaging portion differing from the second joining portion and engageable with a testing apparatus that is one example of the engagement subject. The engaging portion is a portion joined with the engagement subject that rotates the rotor 12 relative to the housing 11 in the housing 11 as the engagement subject rotates. The rotor 12 is used in separate states where the first joining portion is joined with the first input subject, the second joining portion is joined with the second input subject, and the engaging portion is engaged with the engagement subject.

Such a structure has the following advantage.

(9) In the damper, the rotor 12 rotates relative to the housing 11 when the engagement subject is engaged with the engaging portion in addition to when the first input subject is joined with the first joining portion and when the second input subject is joined with the second joining portion.

In the rotor 12, at least one of the first fitting portion 32A and the second fitting portion 32B may be configured as described below. Specifically, the first fitting portion 32A does not have to be configured so that the one-way clutch 14 is fixed to the rotor 12 when the one-way clutch 14 is fitted to the first fitting portion 32A. For example, the first fitting portion 32A may be configured to be joined with the one-way clutch 14 with an adhesive or a fastener. Further, the second fitting portion 32B does not have to be configured so that the rotation shaft RA is fixed to the rotor 12 when the rotation shaft RA is fitted to the second fitting portion 32B. For example, the second fitting portion 32B may be configured to join with the rotation shaft RA with an adhesive or a fastener. Such a structure also obtains an advantage corresponding to advantage (1).

The cap 13 does not have to include the first cap-side wall portions 52, the second cap-side wall portions 53, and the third cap-side wall portions 54.

Second Embodiment

A damper of a second embodiment will now be described with reference to FIGS. 9 and 10. The second embodiment mainly differs from the first embodiment in that the housing is one example of the joining subject and that the housing is rotated relative to the rotor. The differences from the first embodiment will now be described in detail. To facilitate understanding, FIGS. 9 and 10 schematically show the damper and the coupling subject of the damper.

Figure 9:
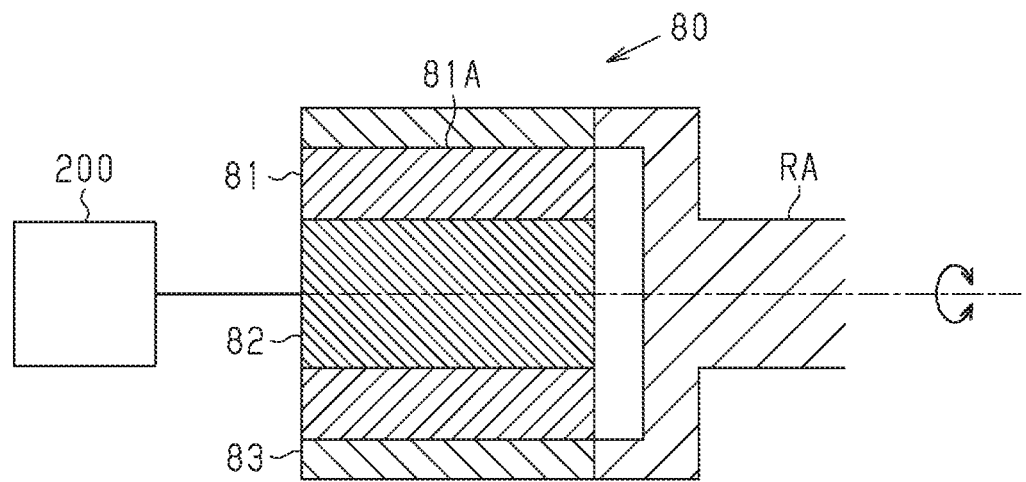
FIG. 9 is a schematic cross-sectional view of a state in which a one-way clutch is fitted into a damper in accordance with a second embodiment.

As shown in FIG. 9, a damper 80 includes a cylindrical housing 81, a rotor 82 accommodated in the housing 81, and a cylindrical one-way clutch 83 located on an outer circumferential surface of the housing 81. In the damper 80, the rotor 82 is coupled to a coupling subject 200 of the damper 80, and the position of the rotor 82 relative to the coupling subject 200 is fixed. In contrast, the housing 81 is configured to rotate relative to the rotor 82. The one-way clutch 83 is located on the outer circumferential surface of the housing 81, and the outer circumferential surface of the housing 81 includes a first joining portion 81A. The one-way clutch 83 sets the rotation of the housing 81 relative to the rotor 82 to a single direction.

The rotation shaft RA is connected to one end of the one-way clutch 83 in the direction in which the rotation shaft RA extends. When the rotation shaft RA is rotated in the counterclockwise direction, for example, the one-way clutch 83 is joined with the housing 81 and rotated relative to the rotor 82 with the housing 81. When the rotation shaft RA is rotated clockwise, the housing 81 is not rotated during rotation of the rotation shaft RA because the one-way clutch 83 is not joined with the housing 81. In this way, the one-way clutch 83 sets the rotation of the housing 81 relative to the rotor 82 to a single direction. Further, the damper 80 dampens the torque of the rotation shaft RA only when the rotation shaft RA is rotated in the counterclockwise direction.

Figure 10:
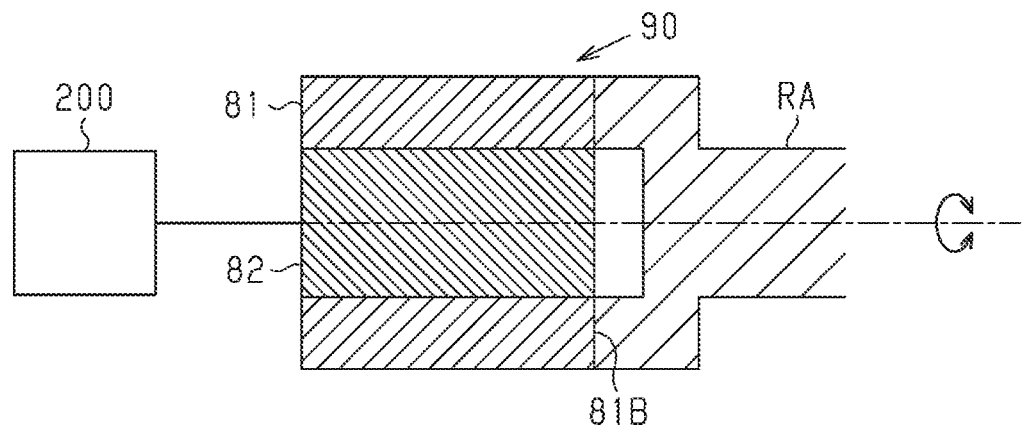
FIG. 10 is a schematic cross-sectional view of a state in which a rotation shaft is connected to a housing of the damper in accordance with the second embodiment.

As shown in FIG. 10, when the one-way clutch 83 is not joined with the housing 81, the rotation shaft RA is joined with the housing 81. The rotation shaft RA is joined with one end of the housing 81 in the direction in which the rotation shaft RA extends, and the housing 81 includes a second joining portion 81B at this end. The housing 81 rotates relative to the rotor 82 with the rotation shaft RA when the rotation shaft RA rotates in both of the clockwise direction and the counterclockwise direction. Thus, regardless of the rotation direction of the rotation shaft RA, a damper 90 dampens the torque of the rotation shaft RA when the rotation shaft RA is rotated.

The second embodiment has an advantage corresponding to advantage (1).

Third Embodiment

A damper of a third embodiment will now be described with reference to FIGS. 11 and 12. In the third embodiment, the location of the rotation shaft relative to the rotor differs from the first embodiment. Thus, the difference from the first embodiment will now be described. To facilitate understanding, FIGS. 11 and 12 schematically show the damper and the coupling subject of the damper.

Figure 11:
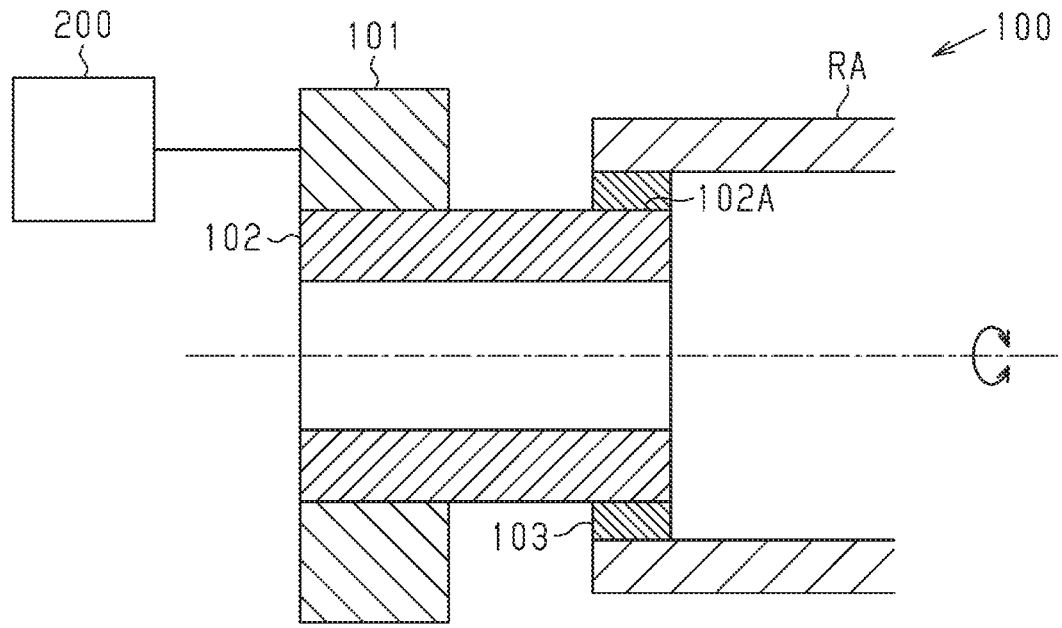
FIG. 11 is a schematic cross-sectional view of a state in which a one-way clutch is fitted into a damper in accordance with a third embodiment.

As shown in FIG. 11, a damper 100 includes a cylindrical housing 101, a cylindrical rotor 102 accommodated in the housing 101, and a cylindrical one-way clutch 103 located on part of an outer circumferential surface of the rotor 102. In the damper 100, the housing 101 is coupled to the coupling subject 200, and the position of the housing 101 relative to the coupling subject 200 is fixed. In contrast, the rotor 102 is configured to rotate relative to the housing 101. The one-way clutch 103 is located on part of the outer circumferential surface of the rotor 102, and the outer circumferential surface of the rotor 102 includes a first joining portion 102A. The one-way clutch 103 sets the rotation of the rotor 102 relative to the housing 101 to a single direction.

The rotation shaft RA is connected to an outer circumferential surface of the one-way clutch 103. For example, when the rotation shaft RA is rotated counterclockwise, the one-way clutch 103 is joined with the rotor 102 to rotate relative to the housing 101 with the rotor 102. When the rotation shaft RA rotates clockwise, the rotor 102 does not rotate as the rotation shaft RA rotates because the one-way clutch 103 is not joined with the rotation shaft RA. In this way, the one-way clutch 103 sets the rotation of the rotor 102 to a single direction. Further, the damper 100 dampens the torque of the rotation shaft RA only when the rotation shaft RA is rotated counterclockwise.

Figure 12:
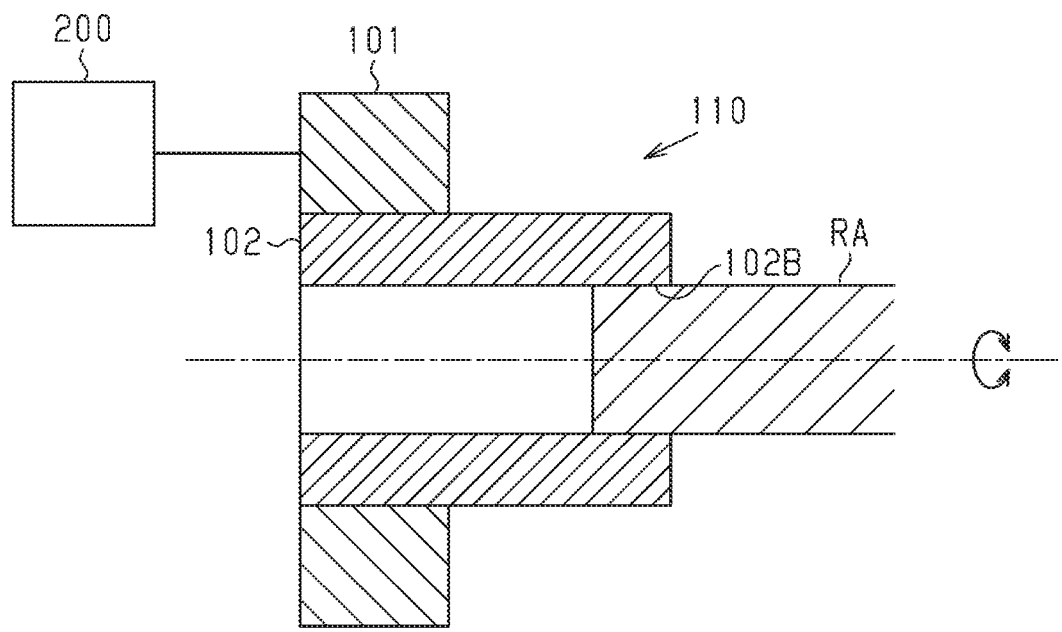
FIG. 12 is a schematic cross-sectional view of a state in which a rotation shaft is connected to a rotor of the damper in accordance with the third embodiment.

As shown in FIG. 12, when the one-way clutch 103 is not joined with the rotor 102, the rotation shaft RA is joined with the rotor 102. The rotation shaft RA is joined with an inner circumferential surface of the rotor 102 at one end in the direction in which the rotation shaft RA extends, and the inner circumferential surface of the rotor 102 includes a second joining portion 102B. The rotor 102 rotates with the rotation shaft RA relative to the housing 101 when the rotation shaft RA rotates in both clockwise and counterclockwise directions. Thus, regardless of the rotation direction of the rotation shaft RA, a damper 110 dampens the torque of the rotation shaft RA when the rotation shaft RA rotates.

The third embodiment has an advantage corresponding to advantage (1).

The invention claimed is:
1. A damper comprising:
a housing accommodating a damping medium; and
a rotor rotatable relative to the housing in the housing, wherein:
one of the housing and the rotor is a joining subject joined with an input subject,
one of the housing and the rotor other than the joining subject is a non-joining subject, a one-way clutch that sets the rotation to a single direction and a rotation shaft are configured to be coaxially joined with each other, the one-way clutch in a state supporting the rotation shaft is a first input subject, the rotation shaft in a state not supported by the one-way clutch is a second input subject, the joining subject includes:
- a first joining portion configured to be coaxially joined with the first input subject, and
- a second joining portion configured to be coaxially joined with the second input subject and rotated integrally with the first joining portion, and the joining subject is used in separate states where the first joining portion is joined with the first input subject and the second joining portion is joined with the second input subject.

2. The damper according to claim 1, wherein:
the second joining portion is engaged with an engagement subject that rotates the rotor relative to the housing in the housing as the engagement subject rotates, and the joining subject is used in separate states where the first joining portion is joined with the first input subject, the second joining portion is joined with the second input subject, and the second joining portion is engaged with the engagement subject.

3. The damper according to claim 1, wherein:
the joining subject is the rotor,
the first joining portion has a fitting surface fitted to the first input subject and including repetitive corrugations in a circumferential direction of the rotation shaft, and
the first joining portion is coaxially joined with the first input subject by fitting the first input subject to the fitting surface.

4. The damper according to claim 1, wherein:
the joining subject is the rotor,
the rotor includes a tubular portion located coaxially with the rotation shaft,
the tubular portion includes one end that is the first joining portion, and
the tubular portion includes another end that is the second joining portion.

5. The damper according to claim 1, wherein the housing has an inner surface including a plurality of projected surfaces extending in a circumferential direction of the rotation shaft and projected toward a space for accommodating the damping medium.

6. The damper according to claim 5, wherein:
the projected surfaces are first projected surfaces projected in a direction in which the rotation shaft extends,
the rotor has an outer surface including a plurality of second projected surfaces extending in the circumferential direction of the rotation shaft and projected toward the housing in the direction in which the rotation shaft extends, each of the second projected surfaces is configured not to overlap the first projected surfaces as viewed in the direction in which the rotation shaft extends, and the first projected surfaces and the second projected surfaces define part of the space for accommodating the damping medium.

7. The damper according to claim 1, wherein:
the second joining portion includes a plurality of projections arranged in a circumferential direction of the rotation shaft and configured to contact and support the rotation shaft, and
each of the projections support the rotation shaft in a state in which the second joining portion is coaxially joined with the second input subject.

8. The damper according to claim 1, wherein:
the damper is a one-way damper that includes the one-way clutch, the one-way clutch includes:
- a tubular accommodation member that extends along the rotation shaft and includes a plurality of holding grooves in an inner circumferential surface,
- a plurality of rod-shaped cylindrical rollers, each extending along the rotation shaft and held in one of the holding grooves, and
- a plurality of biasing members, each held in one of the holding grooves, each of the holding grooves includes a fixing portion that holds the cylindrical roller in a fixed state, a non-fixing portion that holds the cylindrical roller in a rotatable state, and a holding portion that holds the biasing member, the fixing portion, the non-fixing portion, and the holding portion are arranged in this order in the circumferential direction in every one of the holding grooves, each of the biasing members biases the cylindrical roller from the holding portion toward the fixing portion, and each of the cylindrical rollers is held in the holding groove by the holding groove and the biasing member so as to be located in the fixing portion when the rotation shaft is rotated in one direction and located in the non-fixing portion when the rotation shaft is rotated in a direction opposite to the one direction.

9. The damper according to claim 1, wherein:
the joining subject is engaged with an engagement subject that rotates the rotor relative to the housing in the housing as the engagement subject rotates, the joining subject further includes an engaging portion rotated integrally with the first joining portion and the second joining portion, and the joining subject is used in separate states where the first joining portion is joined with the first input subject, the second joining portion is joined with the second input subject, and the engagement subject is engaged with the engaging portion.

* * * * *